United States Patent Office 3,477,964
Patented Nov. 11, 1969

3,477,964
METHOD OF CATALYST MANUFACTURE
Norman A. Fishel, Lansing, Mich., assignor to Universal Oil Products Company, Des Plaines, Ill., a corporation of Delaware
No Drawing. Filed June 30, 1967, Ser. No. 650,198
Int. Cl. B01j *11/64*
U.S. Cl. 252—442                 10 Claims

ABSTRACT OF THE DISCLOSURE

A crystalline aluminosilicate is combined with a metal subfluoride vapor and a catalytic composition of matter is obtained for use as a hydrocarbon conversion catalyst.

DESCRIPTION OF THE INVENTION

This invention relates to the manufacture of a hydrocarbon conversion catalyst and particularly to the manufacture of a novel hydrocarbon conversion catalyst comprising a crystalline aluminosilicate combined with a metal subfluoride vapor.

Halogen-containing catalysts and various methods of manufacturing the same have heretofore been suggested. For example, highly active catalysts for various hydrocarbon conversion reactions have been prepared by impregnating various catalyst supports with a Friedel-Crafts metal halide by sublimation of said Friedel-Crafts metal halide, such as aluminum chloride, onto the surface of a catalyst support. However, the analogous preparation with aluminum fluoride ($AlF_3$) has not been possible since the aluminum fluoride is not volatile. The present invention is based on the discovery that especially high activity catalysts of long useful life may be prepared by a unique method of preparation as hereinafter described.

In a broad embodiment, the present invention affords a catalytic composite of a crystalline aluminosilicate combined with a metal subfluoride.

In another embodiment, the present invention relates to a method for manufacturing a hydrocarbon conversion catalyst which comprises combining a crystalline aluminosilicate with a metal subfluoride vapor at a temperature of from 650° C. to about 1000° C. and at a pressure of from about subatmospheric to about 10 atmospheres and recovering the resultant composite.

As set forth hereinabove, it has been found that especially good catalysts are prepared in accordance with the novel features of the present invention. It is an object of this invention to produce a novel catalytic composition of matter possessing a high degree of activity, as well as stability. This degree of activity renders the catalytic composition of matter especially suitable for use in the chemical, petrochemical, and petroleum industries for the purpose of promoting a multitude of reactions including alkylation, transalkylation, aromatization, dehydrogenation, polymerization of olefin-acting compounds, the isomerization of olefin-acting compounds, including cycloolefins, destructive hydrogenation reactions, and cracking oil heavier than gasolines into lower boiling products and particularly gasoline, including hydrocracking under hydrogen pressure. In addition, the catalyst is regenerable although frequent regenerations will not be necessary, thus satisfying the objective of increased economy of operations.

As hereinbefore set forth, the catalyst comprises a crystalline aluminosilicate combined with a metal subfluoride vapor. The crystalline aluminosilicates are composed of $SiO_4$ and $AlO_4$ tetrahedra, a silicon or aluminum atom being centered around four oxygen atoms in the tetrahedra and the oxygen being shared with other surrounding tetrahedra. These aluminosilicates are geometrically arranged to form a pore structure having sufficiently large pore size to permit the reactant molecules to pass into said pore structure. Preferably, the aluminosilicates employed in the catalyst support have pore sizes of from about 4 up to about 15 Angstroms in cross-sectional diameter. The aluminosilicates are treated to improve their catalytic activity by techniques such as ion-exchange with suitable cations and thermal treatment. Ordinarily, the aluminosilicates are synthetically prepared in the alkali metal form (usually sodium) and there is one monovalent alkali metal cation associated with each aluminum centered tetrahedra (to maintain electrical neutrality). The aluminosilicates may be ion-exchanged with polyvalent cations such as calcium, magnesium, beryllium, rare earths, etc., to replace a substantial amount of the monovalent cations. This causes one polyvalent cation to be associated with more than one aluminum centered tetrahedra and if these tetrahedra are spread sufficiently far apart (due to the presence of silicon centered tetrahedra), areas of local electrical charge will be formed which aid in promoting catalytic reactions. Another treating technique to improve the catalytic activity of the aluminosilicates is to ion-exchange with ammonium ions followed by thermal treatment, preferably above 300° C. to convert the crystalline aluminosilicates to the hydrogen form.

There are numerous types of crystalline aluminosilicates, both synthetic and natural occurring. It is preferable that the pore mouths of the crystalline aluminosilicates have cross-sectional diameters of from about 4 to 15 Angstrom units. Among the preferable crystalline aluminosilicates that are suitable are the hydrogen and/or polyvalent forms of faujasite, and mordenite, and especially preferable is the hydrogen form of mordenite.

The concentration of crystalline aluminosilicate may be as high as 100% or the crystalline aluminosilicate may be held within a matrix which may be selected from the group consisting of silica, alumina, and silica-alumina mixtures.

As set forth hereinabove, the catalyst comprises a crystalline aluminosilicate that is combined with a metal subfluoride vapor to effect combination of the crystalline aluminosilicate with the metal subfluoride. Particularly preferred metal subfluorides include the aluminum subfluorides including aluminum monofluoride and silicon subfluorides including silicon difluoride due mainly to the relative ease in preparing these compounds although the invention is not restricted to their use but may employ any of the known metal subfluorides insofar as they are adaptable. However, it is not intended to infer that different metal subfluorides which may be employed will produce catalysts which have identical effects upon any given organic reaction as each of the catalysts produced from different metal subfluorides and by slightly varying procedures will exert its own characteristic action.

The catalyst of the present invention comprises a crystalline aluminosilicate combined with the metal subfluoride vapor so as to effect combination of the crystalline aluminosilicate with the metal subfluoride vapor and it is the particular association of these components which results in the unusual catalytic properties of this catalyst. The metal subfluoride vapor may be combined with the crystalline aluminosilicate at temperatures in the range of 650° C. to about 1000° C. and at a pressure of from about subatmospheric to about 10 atmospheres. The formation of the metal subfluoride vapor, and especially the formation of aluminum monofluoride is accomplished by sweeping with a gas such as helium, argon or hydrogen, and preferably helium, a stoichiometric mixture of aluminum metal (melting point about 660° C.) and aluminum trifluoride (melting point greater than 1000° C.) which is heated to about 750 to 850° C. The crystalline aluminosilicate which is then chemically combined with the aluminum monofluoride is placed in the downstream helium flow. The chemical combination takes place at temperatures in excess of 650° C. Fluoride concentrations of between 0.01 percent to about 5 percent (by weight) are preferred.

In an alternative method, the catalyst may be prepared by pelleting a mixture of aluminum powder with a stoichiometric excess of aluminum trifluoride, and mixing these pellets with the crystalline aluminosilicate catalyst support and then heating in vacuum in a furnace tube at elevated temperatures.

The following examples are introduced for the purpose of illustration only with no intention of unduly limiting the generally broad scope of the present invention.

Example I

A quartz vessel with provisions for connection to a vacuum system was filled with a mixture of about 94 grams of a 5A crystalline aluminosilicate having a 2:1 silica to alumina mol ratio and about 26 grams of ⅛ inch pellets comprising about 20% aluminum metal and about 80% aluminum trifluoride by weight. The contents of the vessel were outgassed at a pressure of less than $10^{-4}$ mm. while slowly being heated in a tube furnace. Approximately 4½ hours were allowed for the system to reach 600 to about 650° C. The evacuated vessel was then sealed off. The vessel was then placed in a muffle furnace at 750° C. for 1 hour and rotated slowly to aid mixing.

The sealed vessel was cooled to room temperature. After cooling, the vessel was opened in a helium dry box, the somewhat greyish catalyst spheres were separated from the pellets and the catalyst was then placed in vessels which were then sealed.

Example II

In this example, a volatile fluoride (800° C.) is prepared by sweeping with helium a stoichiometric mixture of aluminum metal (melting point 660° C.) and aluminum trifluoride (melting point greater than 1000° C.) which is heated to 750–850° C. Aluminum monofluoride is then produced. A catalyst base in the form of hydrogen form faujasite ⅛ inch diameter pills is then placed in the downstream helium flow and the aluminum monofluoride is chemically combined with the base at a temperature in excess of 650° C.

The catalyst produced by this vapor deposition and chemical combination of the aluminum monofluoride with the hydrogen form faujasite has fluoride levels of less than 5 percent by weight fluoride chemically combined therewith.

Example III

A volatile fluoride (800° C.) is prepared by sweeping with helium a stoichiometric mixture of aluminum metal (melting point 660° C.) and aluminum trifluoride (melting point greater than 1000° C.) which is heated to 750–800° C. Aluminum monofluoride is then produced. A catalyst base in the form of hydrogen form mordenite ⅟₁₆ inch diameter spheres are prepared and placed in the downstream helium flow and the aluminum monofluoride is chemically combined with the base at a temperature in excess of 650° C.

The catalyst produced by this vapor deposition and chemical combination of the aluminum monofluoride with the hydrogen form mordenite has fluoride levels of less than 5 weight percent of fluoride chemically combined therewith.

I claim as my invention:

1. A method for manufacturing a hydrocarbon conversion catalyst which comprises combining a crystalline aluminosilicate with a metal or silicon subfluoride vapor at a temperature of from about 650° C. to about 1000° C. and at a pressure of from about subatmospheric to about 10 atmospheres and recovering the resultant catalytic composite.

2. The method of claim 1 further characterized in that said subfluoride is aluminum monofluoride and that said crystalline aluminosilicate contains silica and alumina tetrahedra having uniform pores.

3. The method of claim 2 further characterized in that said crystalline aluminosilicate is the faujasite type.

4. The method of claim 2 further characterized in that said crystalline aluminosilicate is the mordenite type.

5. The method of claim 4 further characterized in that said mordenite is in the hydrogen form.

6. The method of claim 1 further characterized in that said subfluoride is an aluminum subfluoride.

7. The method of claim 1 further characterized in that said subfluoride is an silicon subfloride.

8. As a catalyst, the reaction product of a crystalline aluminosilicate with a metal or silicon subfluoride vapor, said reaction product having been formed at a temperature of from about 650° C. to about 1000° C.

9. The catalyst of claim 8 further characterized in that said subfluoride is an aluminum subfluoride.

10. The catalyst of claim 8 further characterized in that said subfluoride is a silicon subfluoride.

References Cited

UNITED STATES PATENTS 3,013,984  12/1961  Breck _____ 252—455
3,354,078  11/1967  Miale et al. _____ 252—455 X DANIEL E. WYMAN, Primary Examiner C. F. DEES, Assistant Examiner U.S. Cl. X.R.

252—455